United States Patent
Kramer

(10) Patent No.: US 7,416,349 B2
(45) Date of Patent: Aug. 26, 2008

(54) FIBER OPTIC ADAPTER MODULE

(75) Inventor: Anne Kramer, Berlin (DE)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/191,153

(22) Filed: Jul. 27, 2005

(65) Prior Publication Data

US 2007/0025675 A1   Feb. 1, 2007

(51) Int. Cl.
*G02B 6/36*   (2006.01)

(52) U.S. Cl. .............................. 385/77; 385/58; 385/70

(58) Field of Classification Search .................. 385/58, 385/70, 77
See application file for complete search history.

(56) References Cited

U.S. PATENT DOCUMENTS

| | | | |
|---|---|---|---|
| 5,317,663 A | 5/1994 | Beard et al. | |
| 5,497,444 A | 3/1996 | Wheeler | |
| 5,717,810 A | 2/1998 | Wheeler | |
| 5,887,095 A * | 3/1999 | Nagase et al. | 385/58 |
| 5,987,203 A | 11/1999 | Abel et al. | |
| 6,504,988 B1 | 1/2003 | Trebesch et al. | |
| 6,532,332 B2 | 3/2003 | Solheid et al. | |
| 6,591,051 B2 | 7/2003 | Solheid et al. | |
| RE38,311 E | 11/2003 | Wheeler | |
| 2003/0007767 A1 | 1/2003 | Douglas et al. | |
| 2003/0095772 A1 | 5/2003 | Solheid et al. | |
| 2003/0147597 A1 | 8/2003 | Duran | |
| 2006/0093274 A1 | 5/2006 | Kahle et al. | |
| 2006/0093301 A1 | 5/2006 | Zimmel et al. | |

FOREIGN PATENT DOCUMENTS

WO   WO/03/093883 A2   11/2003

OTHER PUBLICATIONS

Pending U.S. Appl. No. 11/138,063, filed May 25 2005 entitled "Fiber Optic Splitter Module".
Pending U.S Appl. No. 11/138,889, filed May 25, 2005 entitled "Fiber Optic Adapter Module".

* cited by examiner

*Primary Examiner*—Kevin S Wood
*Assistant Examiner*—Jerry T Rahll
(74) *Attorney, Agent, or Firm*—Merchant & Gould P.C. ADC

(57) ABSTRACT

A fiber optic adapter module is disclosed. The fiber optic adapter module includes a molded one-piece housing including a first end and a second end, the housing including at least three openings extending from the first end to the second end, each opening defining a separate fiber optic adapter for interconnecting two cables terminated with fiber optic connectors. The housing is movably mounted on a fixture, wherein the module is movable relative to the fixture along a line of travel that is non-parallel to longitudinal axes of the openings. The fiber optic adapter also includes a sleeve mount mounted within each of the openings of the housing, the sleeve mount configured to be inserted into the opening in a direction extending from the first end to the second end, generally parallel to the longitudinal axis of the opening.

18 Claims, 11 Drawing Sheets

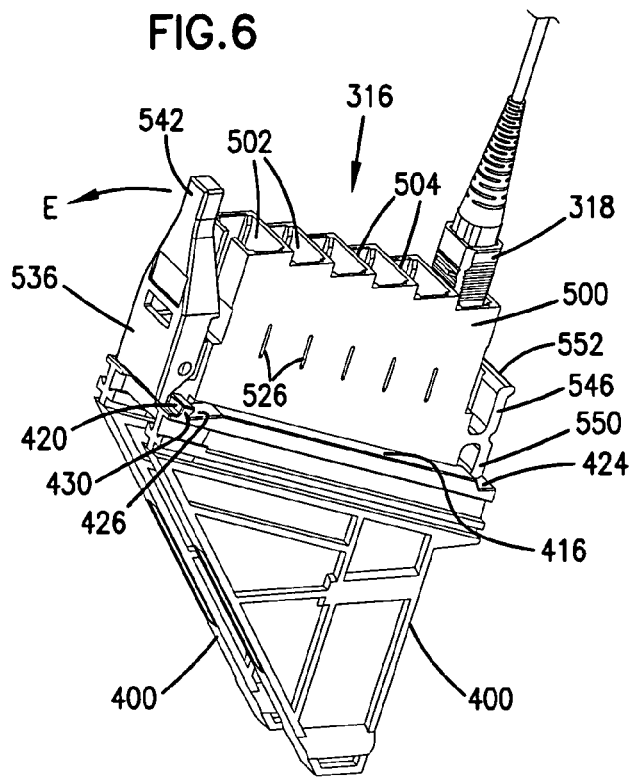
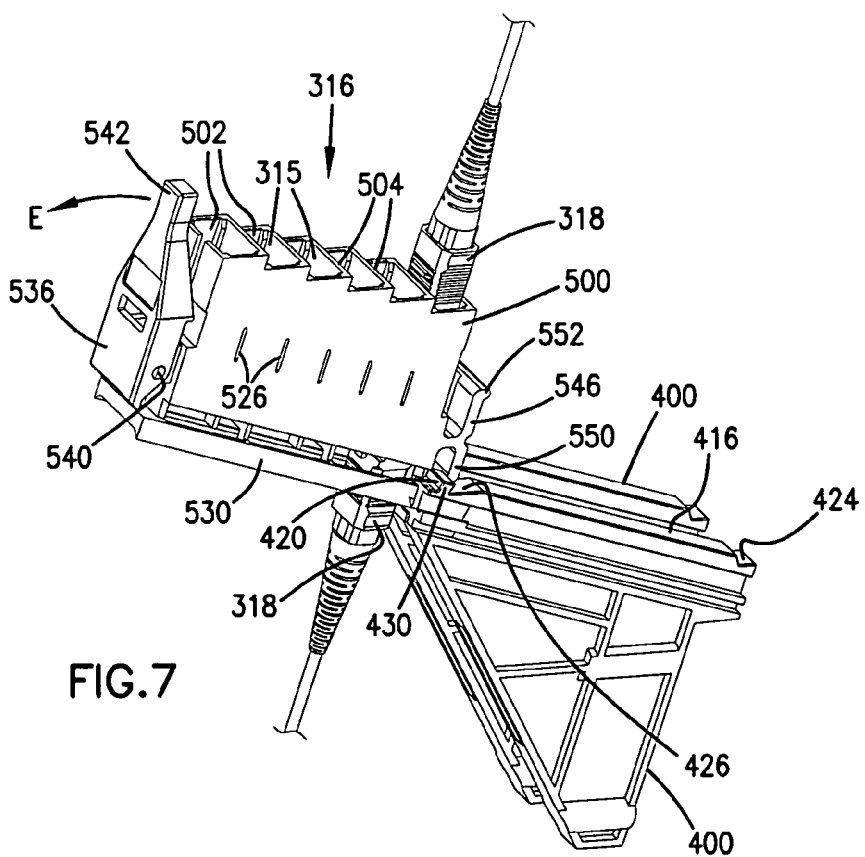

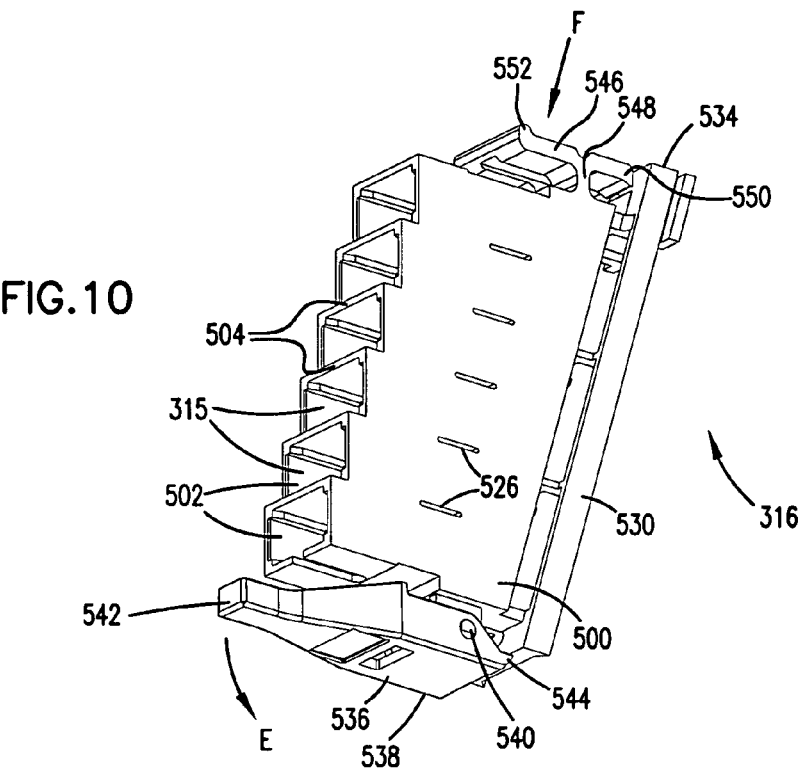
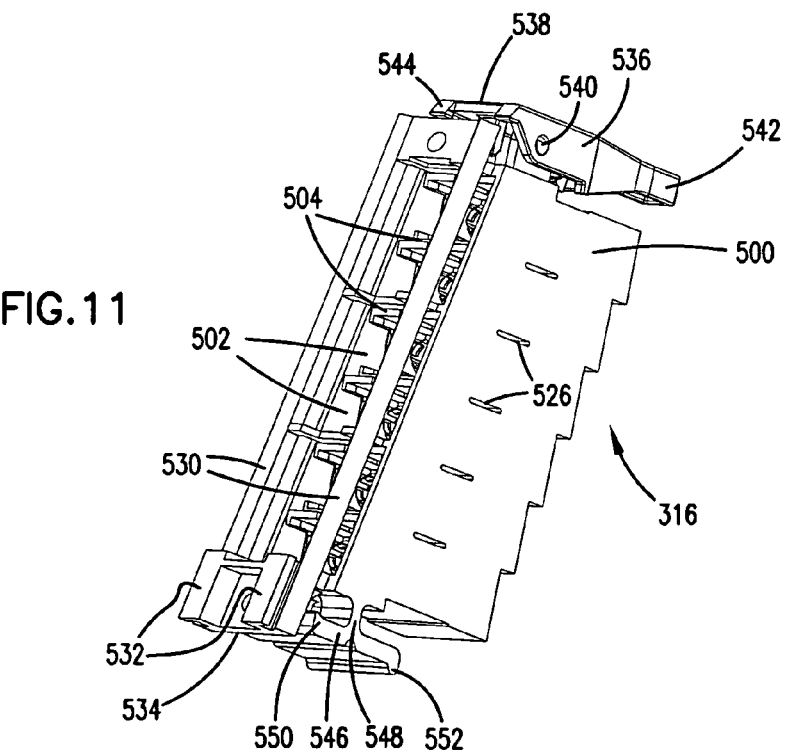

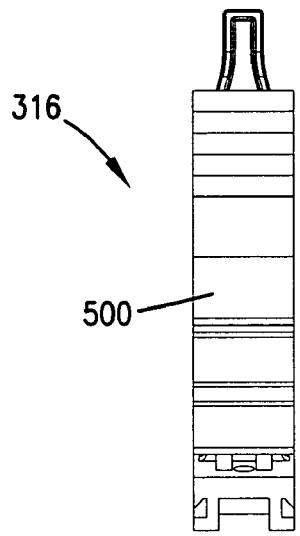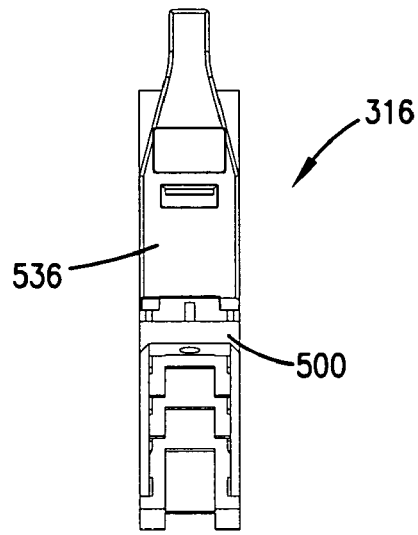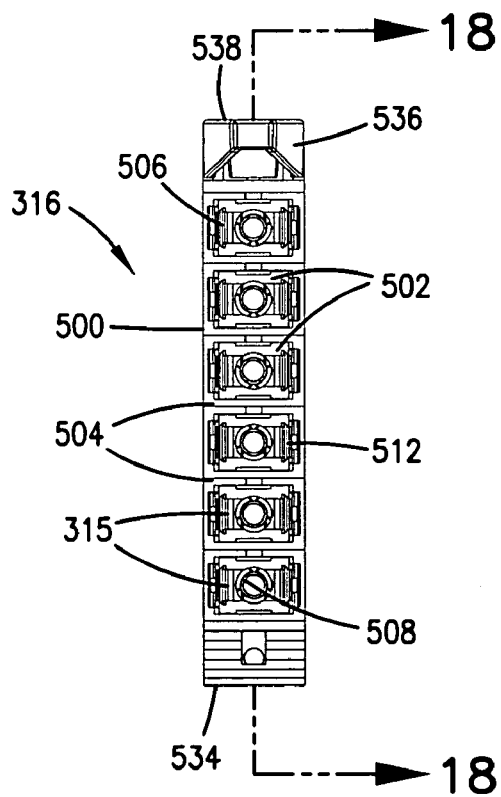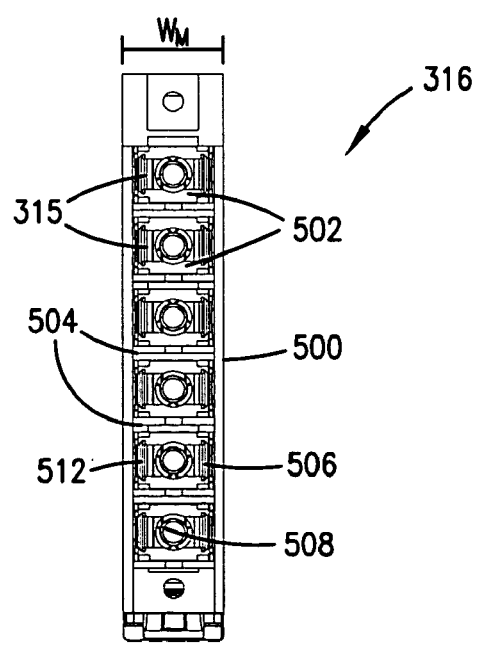

FIBER OPTIC ADAPTER MODULE

FIELD

The present invention relates generally to fiber optic telecommunications equipment. More specifically, the present invention relates to a fiber optic adapter module designed for high density applications.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs. Further development in such fiber termination systems is desired.

SUMMARY

The present invention relates to a fiber optic telecommunications device. The telecommunications device is a fiber optic adapter module. The adapter module defines a generally one-piece block of adapters for optically connecting fiber optic cables terminated with connectors. The block defines a plurality of openings for forming an integral array of adapters.

In one preferred embodiment, the openings forming the array of adapters are separated by walls that include slits allowing for the walls to be flexed out when sleeve mounts are being inserted within the openings. The slits allow two adjacent adapters to share a wall minimizing the overall length of the adapter array.

According to one inventive aspect, the block is configured for slidable movement relative to a fixture to which it is mounted thereon for providing access to the array of adapters and connectors.

According to another inventive aspect, the fiber optic adapter module includes a molded one-piece housing including a first end and a second end, the housing including at least three openings extending from the first end to the second end, each opening defining a separate fiber optic adapter for interconnecting two cables terminated with fiber optic connectors. The housing is movably mounted on a fixture, wherein the module is movable relative to the fixture along a line of travel that is non-parallel to longitudinal axes of the openings. The fiber optic adapter also includes a sleeve mount mounted within each of the openings of the housing, the sleeve mount configured to be inserted into the opening in a direction extending from the first end to the second end, generally parallel to the longitudinal axis of the opening.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 6 is a perspective view of the sliding adapter module of FIG. 3, the adapter module shown mounted on a pair of walls of FIGS. 4-5, the sliding adapter module shown in a retracted position relative to the walls and shown with a pair of fiber optic connectors connected thereto (only one visible);

FIG. 7 is a perspective view of the sliding adapter module and the walls of FIG. 6, the sliding adapter module shown in a fully extended position relative to the walls and shown with the pair of fiber optic connectors connected thereto;

FIG. 10 is a top perspective view of the sliding adapter module of FIG. 9, shown in a fully assembled configuration;

FIG. 11 is a bottom perspective view of the sliding adapter module of FIG. 9, shown in a fully assembled configuration;

FIG. 14 is a front view of the sliding adapter module of FIG. 9;

FIG. 15 is a back view of the sliding adapter module of FIG. 9;

FIG. 16 is a top view of the sliding adapter module of FIG. 9;

FIG. 17 is a bottom view of the sliding adapter module of FIG. 9;

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1:
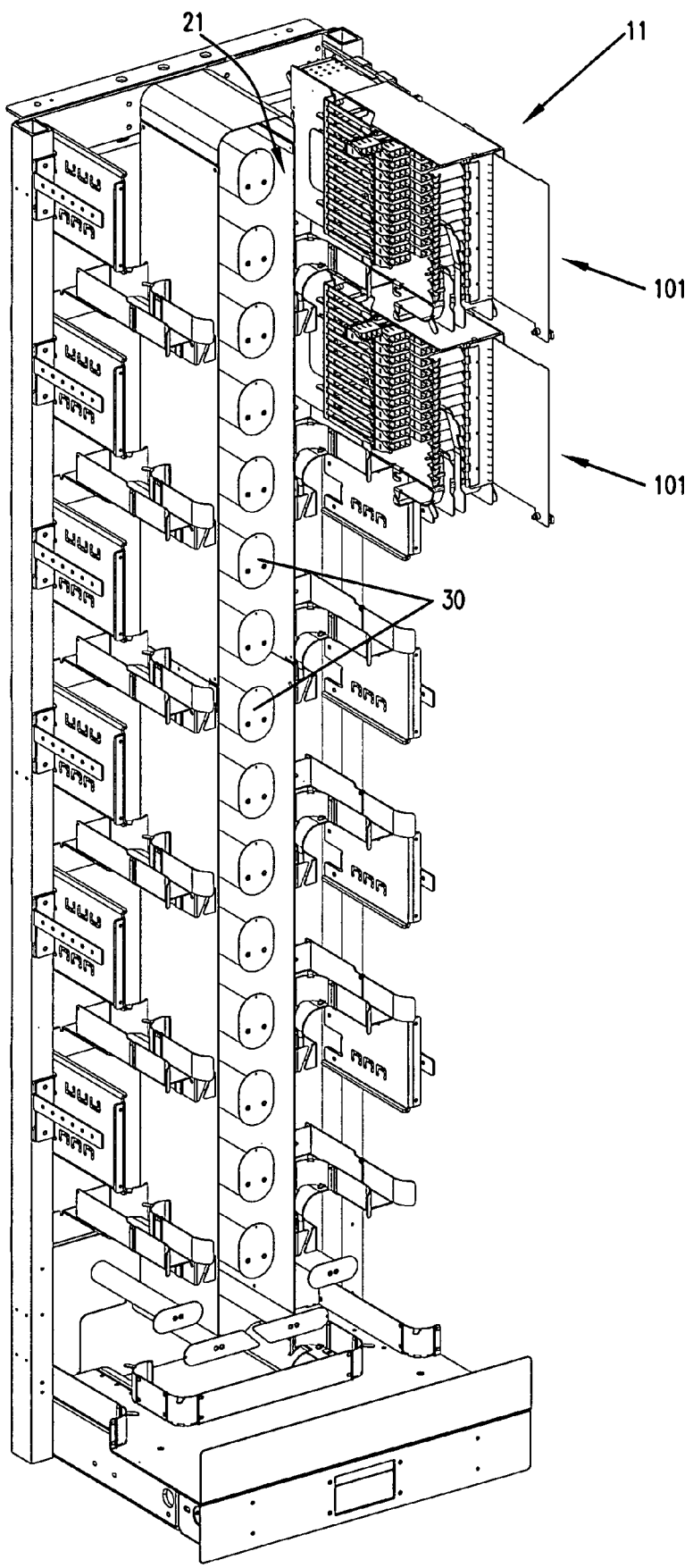
FIG. 1 is a front perspective view of a high-density fiber distribution frame having features that are examples of inventive aspects in accordance with the principles of the present disclosure, the high-density fiber distribution frame shown with two fiber termination blocks mounted thereon, the fiber termination blocks having features that are examples of inventive aspects in accordance with the principles of the present disclosure.

A high-density distribution frame 11 and two high-density fiber termination blocks 101 having features that are examples of inventive aspects in accordance with the principles of the present disclosure are illustrated in FIG. 1. A similar high-density distribution frame 11 is described in U.S. Pat. No. 6,591,051, the disclosure of which is incorporated by reference.

Referring to FIG. 1, the fiber distribution frame 11 is adapted to receive two vertical rows of six of the fiber termination blocks 101, two of which are shown mounted in FIG. 1. Similar fiber termination blocks are also described in the '051 patent. Located intermediately between these two rows of fiber termination blocks 101 is a jumper storage trough 21 that defines a series of spools 30 for organizing and storing excess slack in cross-connect cables used to link between optical fiber terminations inside the fiber termination blocks 101.

Figure 2:
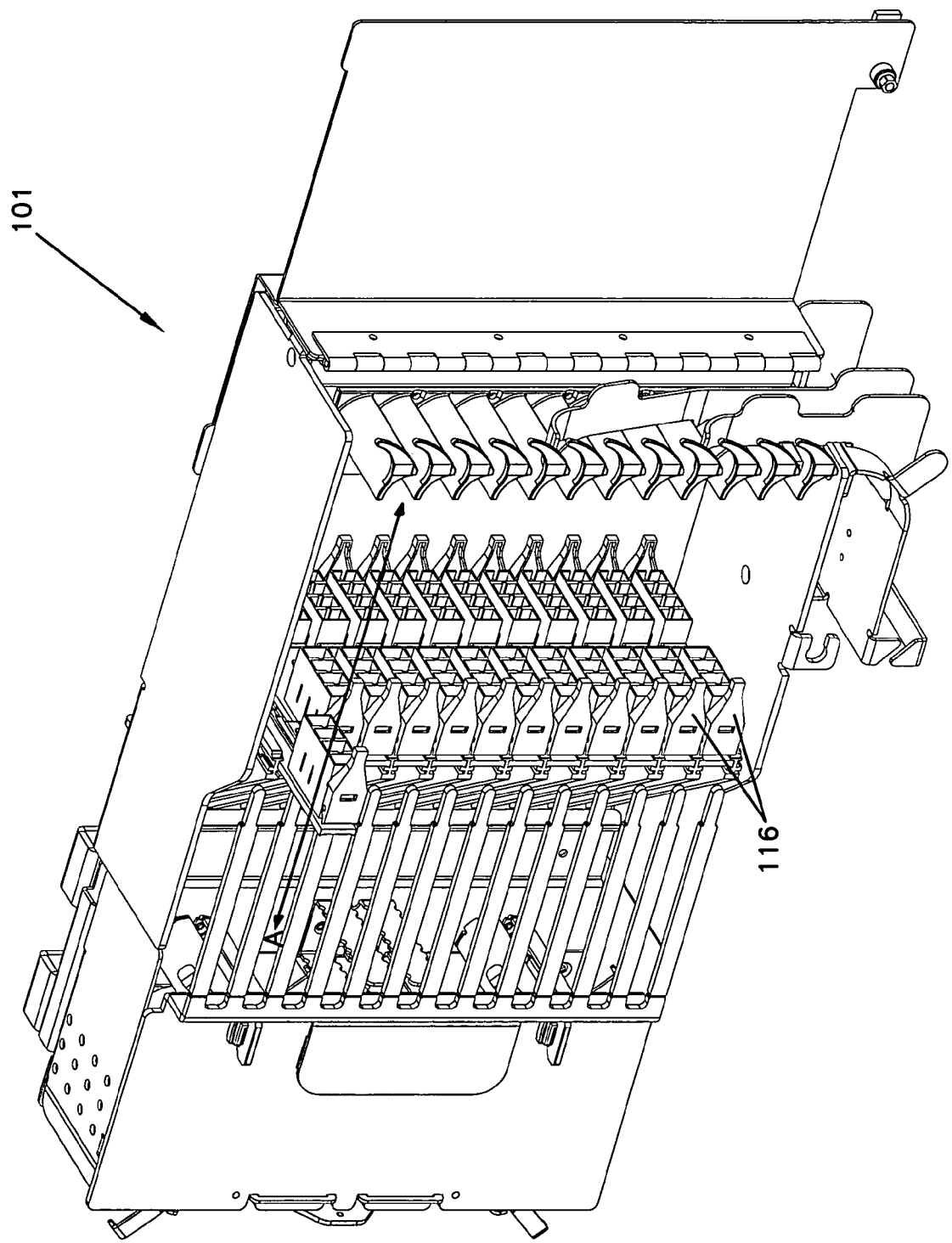
FIG. 2 is a front perspective view of one of the fiber termination blocks shown in FIG. 1, the fiber termination block shown with a cover open and with a sliding adapter module extended, the sliding adapter module having features that are examples of inventive aspects in accordance with the principles of the present disclosure.

The fiber termination block 101 is illustrated in FIG. 2. The fiber termination block 101 includes a plurality of sliding adapter modules 116 having features that are examples of inventive aspects in accordance with the principles of the present disclosure. The sliding adapter modules 116 are configured to slide outwardly from the fiber termination block 101 to provide selective access to the connectors mounted therein. The adapter modules 116 slide in a direction generally perpendicular to the longitudinal axes A of the connectors mounted on the modules (see FIG. 2).

Figure 3:
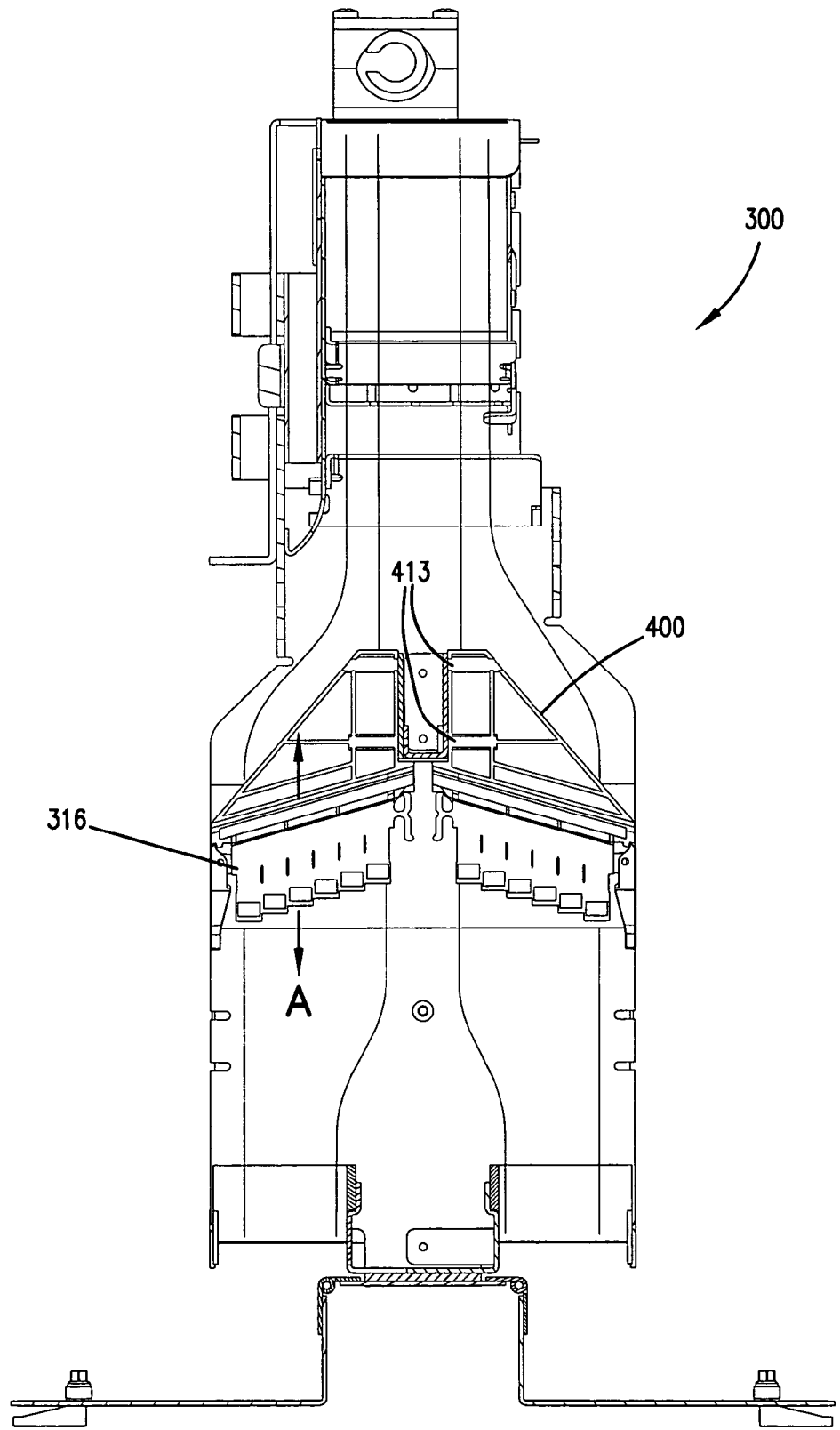
FIG. 3 is a top cross-sectional view of an alternative embodiment of a fiber termination block having features that are examples of inventive aspects in accordance with the principles of the present disclosure, the fiber termination block including an alternative embodiment of a sliding adapter module having features that are examples of inventive aspects in accordance with the principles of the present disclosure.

FIG. 3 illustrates another embodiment of a fiber termination block 300 having features that are examples of inventive aspects in accordance with the principles of the present disclosure. A fiber termination block that is similar to the fiber termination block 300 is also described in the '051 patent. The fiber termination block 300 includes an alternative embodiment of a sliding adapter module 316 having features that are examples of inventive aspects in accordance with the principles of the present disclosure. The sliding adapter module 316 is similar to the sliding adaptor module 116 of FIGS. 1-2 except that adapter module 316 is configured to slide at a non-perpendicular angle relative to the longitudinal axes A of the connectors mounted on the modules. As seen in FIG. 3, the adapter module 316 has a stepped configuration.

The following discussion will focus on the angled sliding adapter modules 316, it being understood that the following description is also fully applicable to the adapter module 116 shown in FIGS. 1-2.

Figure 4:
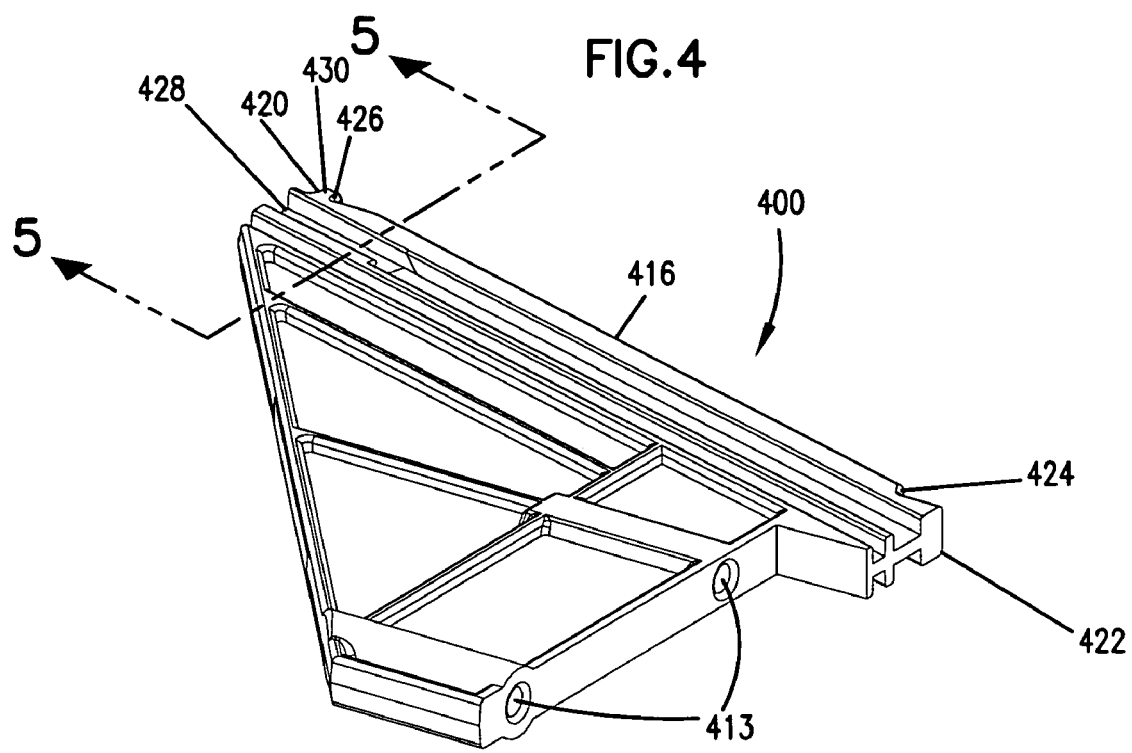
FIG. 4 is a perspective view of a wall constructed for mounting a sliding adapter module to the fiber termination block of FIG. 3.
Figure 5:
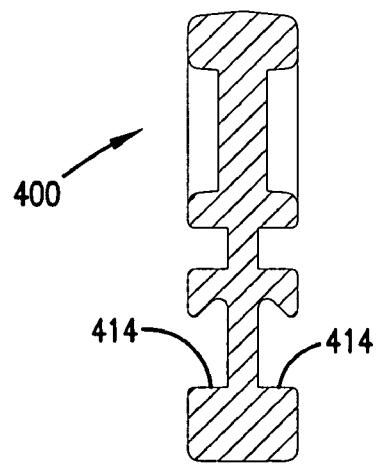
FIG. 5 is a cross-sectional view of the wall taken along line 5-5 of FIG. 4.

Referring still to FIG. 3, the slidable adapter module 316 is mounted to the fiber termination block 300 via walls 400. Each wall 400 is designed to provide slidability for the adapter module 316. In FIGS. 4-5, one of the walls 400 is shown in closer detail. Each wall 400 includes a guide edge 416 which defines a first notch 424 adjacent a first end 422 of the guide edge 416 and a second notch 426 adjacent the second end 428 of the guide edge. The second notch 426 is defined by a tab 430 that forms a shoulder 420 at the opposite side of the tab 430 from the second notch 426. Referring to the cross-sectional view of the wall 400 in FIG. 5, the wall 400 also defines a pair of linear grooves 414 on opposite sides of the wall 400. A groove 414 from one wall is configured to cooperate with an opposing groove 414 from an adjacent wall to provide a track for the sliding adapter module 316, as will be described in further detail below. The walls 400 also include fastener openings 413 for mounting to a telecommunications device such as the fiber termination block 300 (see FIG. 3).

Referring now to FIGS. 6-7, the sliding adapter module 316 is shown slidably mounted on a pair of walls 400 that cooperatively form a track for the slidable adapter module 316. In FIG. 6, the sliding adapter module 316 is shown in a retracted position relative to the walls 400. In FIG. 7, the sliding adapter module 316 is shown in a fully extended position relative to the walls 400.

Referring now to FIGS. 8-18, the sliding adapter module 316 is illustrated. The adaptor module 316 includes a module housing 500 that forms a block of adapters 315. The housing 500 defines a plurality of openings 502 that form an array of adapters 315 for receiving connectors. The openings 502 are separated by walls 504. The housing 500 defines slits 526 through the separating walls 504 to allow for the radial outward flexing of the walls 504 during the insertion of the sleeve mount 506 into the openings as will be discussed in further detail below (see FIG. 19). Each slit 526 separates the wall 504 into opposing wall sections, a first wall section 505 and a second wall section 507.

Figure 8:
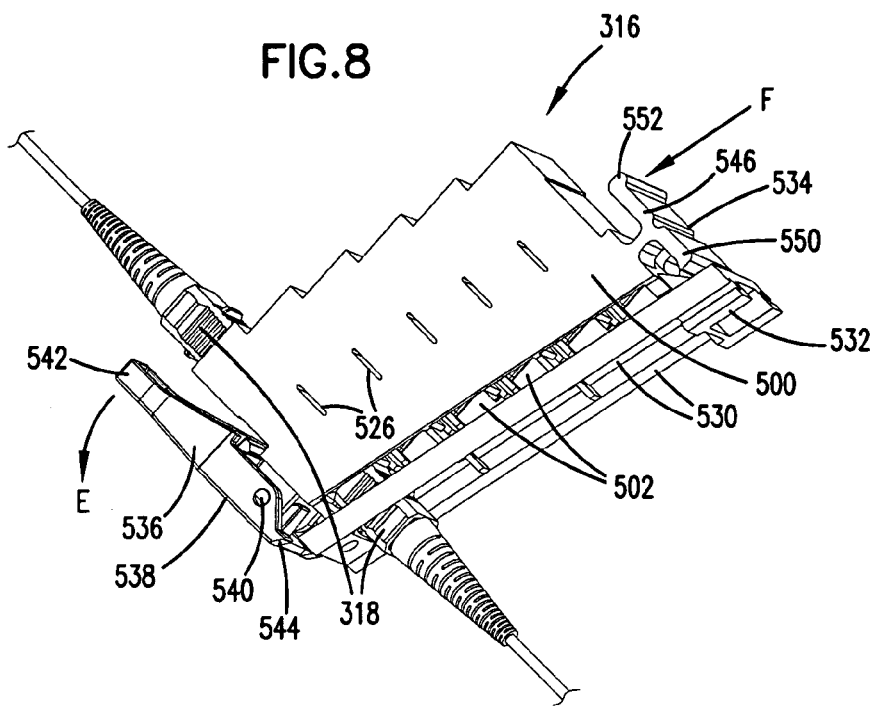
FIG. 8 is a bottom perspective view of the sliding adapter module of FIG. 3, the adapter module shown with a pair of fiber optic connectors connected thereto.

In the example shown in FIGS. 8-18, the housing 500 defines six openings 502 which define six integral adaptors 315. It will be appreciated that any number of integral adapters may be formed in the housing 500 by varying the number of openings 502. It should also be noted that although the illustrated adapters 315 are configured to receive SC-type connectors, the housing 500 can be designed to interconnect other types of connectors. In FIGS. 6-8, the sliding adapter module 316 is shown with a pair of SC-type connectors 318 mounted in one of the adapter openings 502 that are defined in the housing 500.

Figure 9:
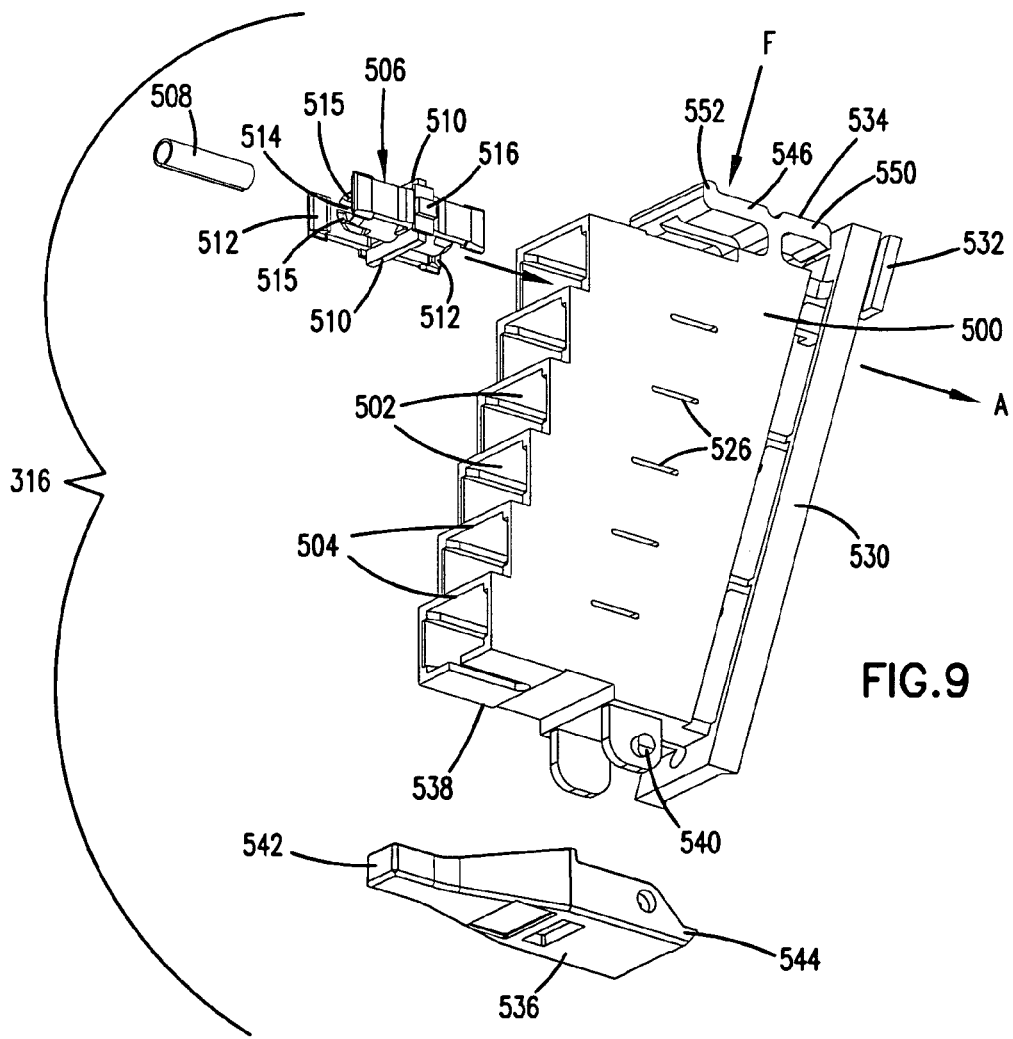
FIG. 9 is an exploded perspective view of the sliding adapter module of FIG. 3, showing the sleeve, the sleeve mount, and the pivoting handle of the adapter module removed from the sliding adapter module.
Figure 12:
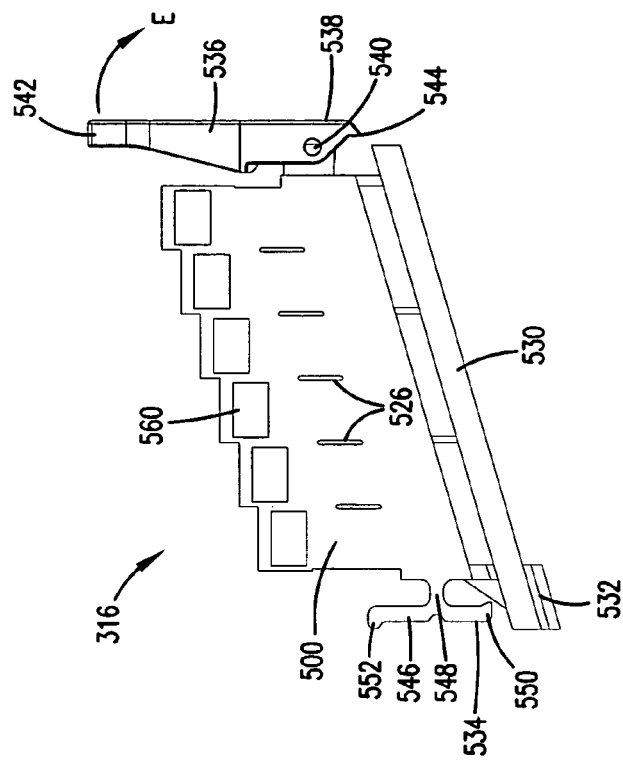
FIG. 12 is a right side view of the sliding adapter module of FIG. 9.
Figure 13:
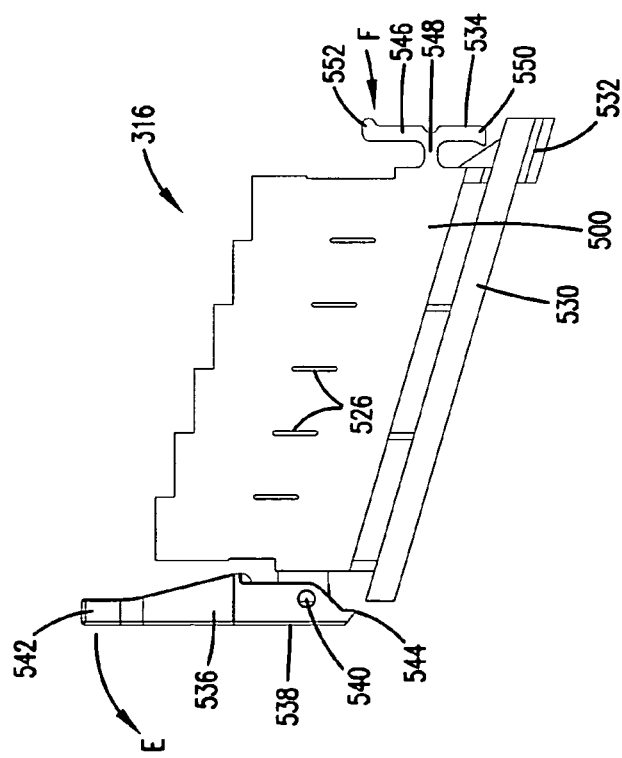
FIG. 13 is a left side view of the sliding adapter module of FIG. 9.
Figure 18:
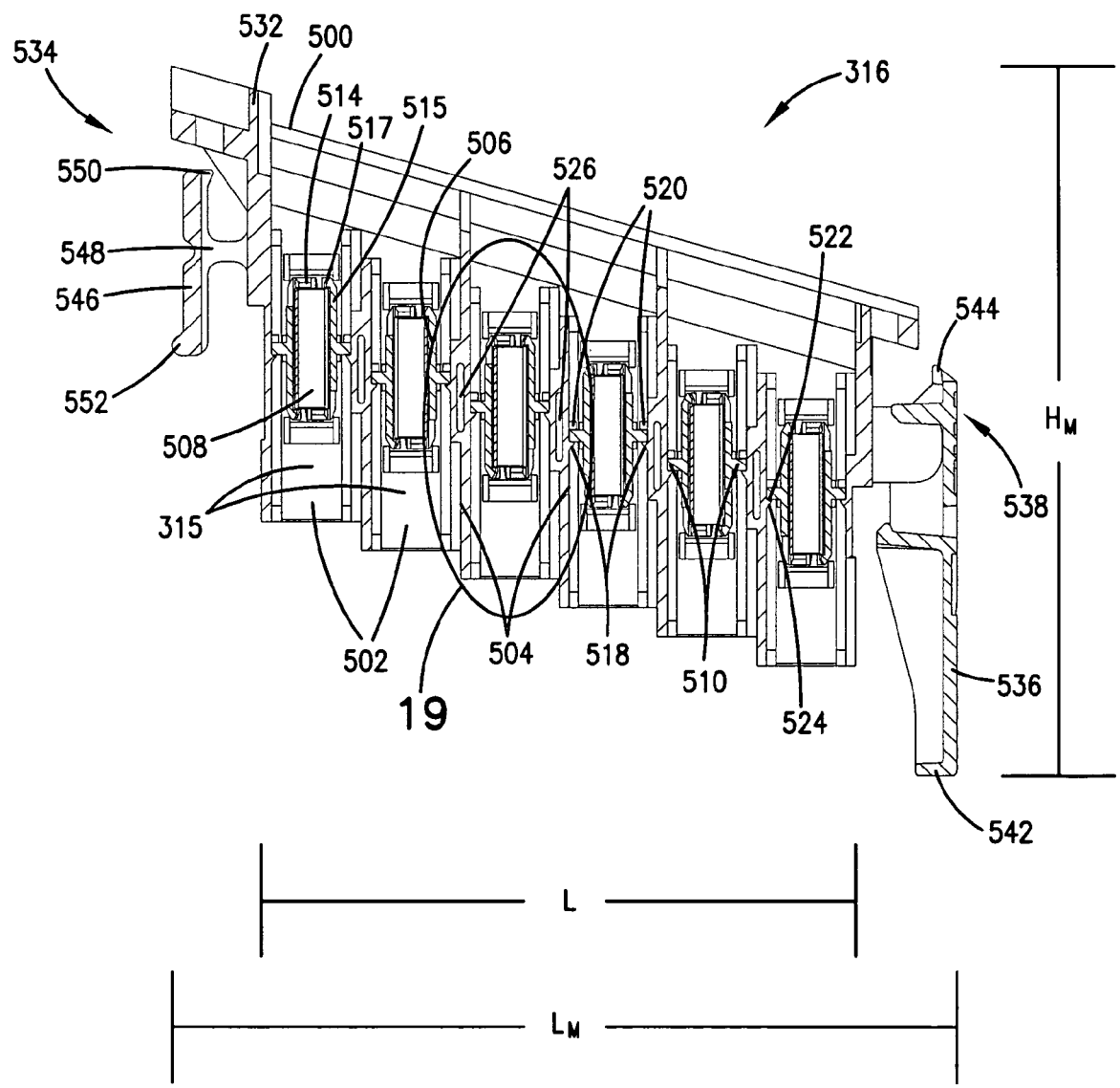
FIG. 18 is a cross-sectional view of the sliding adapter module of FIG. 9, taken along line 18-18 of FIG. 16.

As mentioned above, the block of adapters 315 described herein is designed for SC-type connectors (referenced by 318 in FIGS. 6-8). Therefore, the inner configuration of the adapter openings 502 including the structure of the separating walls 504 are designed to accommodate SC-type connectors. In FIG. 9, the internal components of the sliding adapter module 316 are shown. The internal components include a sleeve mount 506 and a ferrule sleeve 508 that is designed to be inserted within the sleeve mount 506. The sleeve mount 506 is generally a one-piece design and is configured to receive an SC-type connector from each end for interconnection.

The sleeve mount 506 includes latching noses 510, latching hooks 512, an axial bore 514, and spacers 516. The sleeve mount includes flexible arms 515 defined around the axial bore 514. The sleeve 508 is configured to be received within the axial bore 514 of the sleeve mount 506 wherein the flexible arms 515 flex out radially to receive the sleeve 508 with a snap fit arrangement. The flexible arms 515 include inwardly extending fingers 517 for holding the sleeve 508 within the axial bore 514 once the sleeve 508 is received within the bore 514 (see FIG. 19). The sleeve 508 can be inserted into the axial bore 514 from either end of the sleeve mount 506. The sleeve 508 may also include a slit 509 for allowing the sleeve 508 to compress, elastically reducing its diameter during insertion into the axial bore 514. The latching nose 510 is designed to provide a snap fit for the sleeve mount 506 within the adapter opening 502. The latching nose 510 is generally rectangular in shape. The latching hooks 512 are used for latching the SC-type connectors 318 to the adapters 315. The spacers 516 provide a guiding edge for guiding the sleeve mount 506 within the adapters openings 502 when the sleeve mount 506 is being inserted within the adapter openings 502. The sleeve mounts 506 are inserted into the adapter openings 502 of the housing 500 from one end in a direction along the longitudinal axes A of the openings 502 (see FIG. 9).

Figure 19:
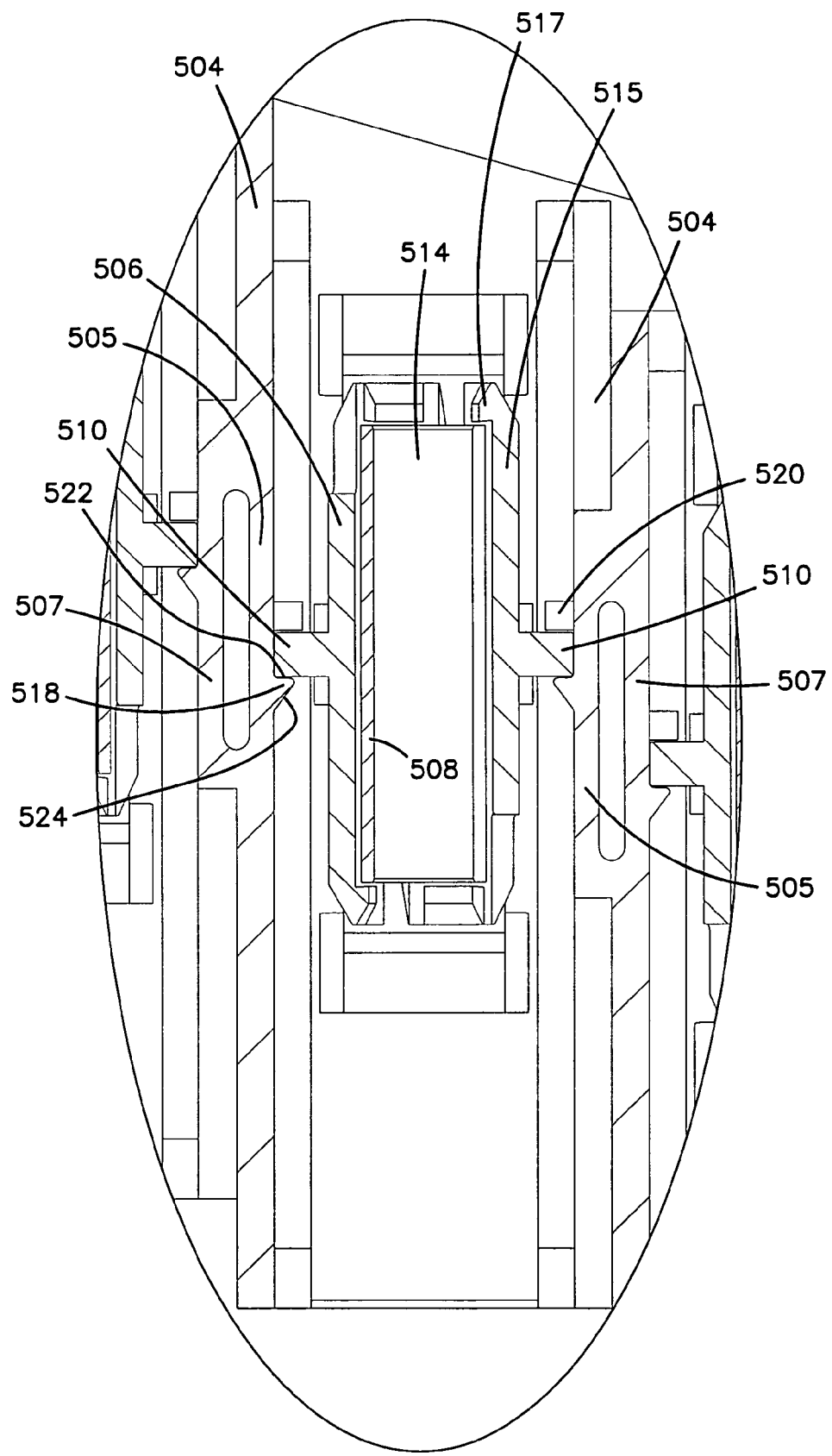
FIG. 19 is an enlarged portion of the cross-sectional view of FIG. 18.

FIG. 19 illustrates an enlarged cross-sectional view of the adapter module 316 showing the intermating structures of the sleeve mount 506 and the housing 500. Within the adapter openings 502, on each of the two opposing adapter walls 504 that form the adapter opening 502, the housing 500 defines a latching tab 518 and a latching stop 520 that cooperate with the latching nose 510 of the sleeve mount 506. The latching tab 518 includes a square face 522 and a ramped surface 524. During the insertion of the sleeve mount 506, the ramped surface 524 makes contact with the latching nose 510 of the sleeve mount 506 and causes the first wall section 505 of each opposing wall 504 to elastically flex out toward the second wall section 507 of each opposing wall 504. Once the latching nose 510 clears the ramp 524, the first wall section 505 flexes back in and the latching nose 510 is captured between the square face 522 of the latching tab 518 and the latching stop 520. The slit 526 defined through the separating walls 504 allows for the outward flexing of the first wall sections 505 during the insertion of the sleeve mount 506 without interfering with an adjacent adapter opening 502. In this manner, an array of adapters 315 may be formed wherein each adapter is lined up adjacent to the next adapter sharing a separating wall and with the sleeve mounts 506 being insertable from the ends of each of the adapter openings 502. The slits 526 formed in the separating walls 504 makes it possible to provide the interlocking structures such as the latching tab 518 and the latching stop 520 on the separating walls 504 since the first wall sections 505 can flex toward the second walls sections 507 without the insertion of the sleeve mount 506 interfering with an adjacent adapter opening 502. With an end-mount configuration such as the one described herein, the sleeve mount 506 can be inserted into the housing 500 after the manufacture of the housing 500. Thus, a one piece housing 500 and a one-piece sleeve mount 506 can be used to form a block of SC adapters 315. This facilitates assembly and reduces manufacturing costs compared to multi-piece housings and multi-piece sleeve mounts. Features of the interface between a one-piece housing and a sleeve mount are shown in U.S. patent application Ser. No. 10/513,207, the disclosure of which is incorporated by reference. Furthermore, the overall length of the array of adapters can be reduced by providing a design where adjacent adapters share a separating wall that has a slit for allowing flexibility of the wall without interference with an adjacent adapter.

For slidability, the adapter module housing 500 defines a pair of cooperating guide rails 530 for slidably mating with the grooves 414 formed on the wall 400. The guide rails 530 include a guide extension 532 adjacent a back end 534 of the housing 500 for facilitating insertion of the housing 500 onto the grooves 414 of the wall 400. The module 316 includes a pivoting handle 536 at a front end 538 of the housing 500. The pivoting handle 536 is configured to pivot about hinge 540 in the direction of arrow E. The pivoting handle 536 includes a push/pull tab 542 and a lever tip 544. The pivoting handle 536 is shown detached from the housing 500 in FIG. 9. A similar pivoting handle structure is described in the '051 patent mentioned above.

The module 316 also includes a rotating locking member 546 that is integrally formed with the housing 500 at the back end 534 of the housing 500. The locking member 546 is molded to the housing 500 at a mid portion 548 of the locking member 546, about which the locking member 546 can be elastically rotated. The locking member 546 includes a locking tab 550 and a releasing tab 552.

In the retracted position of the module 316 (see FIG. 6), the lever tip 544 of the pivoting handle 536 rests against the shoulder 420 at the second end 428 of the wall 400 and the locking tab 550 of the locking member 546 rests within the first notch 424 at the first end 422 of the wall 400. For releasing the housing 500 for slidable movement, when the handle 536 is pivoted in the direction of the arrow E, the lever tip 544 pushes against the shoulder 420 and moves the housing 500 forward, lifting the locking tab 550 of the locking member 546 out of the first notch 424 (by elastically rotating the locking member 546). After the housing 500 is released, the housing 500 can be manually pulled such that the guide rails 530 slide within the linear grooves 414 of the walls 400 until the locking tab 550 of the locking member 546 falls into the second notch 426 defined at the second end 428 of the walls 400. As such, when the module 316 is in the fully extended position (see FIG. 7), the module 316 is prevented from sliding off the walls 400.

If desired, at the fully extended position, the releasing tab 552 of the locking member 546 may be pressed in the direction of the arrow F to rotate the locking member 546 and move the locking tab 550 out of the second notch 426 to allow module 316 to be separated from walls 400 and the rest of the fiber termination block 300, such as for repair or replacement of the adaptor module. The rotational configuration of the integral locking member 546 facilitates release of the module housing 500 because a person, while pressing on the release tab 552 can, at the same time, press on the pivoting handle 536 at the other end of the housing 500 to obtain leverage for a strong squeeze. The housing 500 and the integral rotating locking member 546 are preferably molded out of materials that are flexible and strong enough to allow for repeated elastic rotation to unlatch the sliding module 316 from the walls 400. In certain embodiments, the housing 500 may be made from VALOX® PBT Resin.

The module 316, by being manufactured from a single-piece housing 500 defining an integral block of adapters 315, can have reduced overall length, width, and height allowing for higher density of fiber terminations. For example, each adapter opening 502 includes a major dimension D1 and a minor dimension D2 wherein the major dimension D1 is greater than the minor dimension D2 (see FIG. 10). The housing is configured such that openings 502 are lined up along their minor dimensions D2 forming a length L1 for the entire array of adapters 315 (see FIG. 18). The major dimension D1 is sized to generally correspond to the longer side of the rectangular face of an SC-type connector and the minor dimension D2 is sized to generally correspond to the shorter side of the rectangular face of an SC-type connector, which are commonly known in the art. By aligning the minor dimensions D2 of the adapters openings 502 to form the array of adapters, the overall length L1 of the array of adapters can be reduced relative to separately mounted adapters. As discussed previously, the configuration of the adapter walls 504 with the slits 526 defined through each of the adapter walls 504 enables an adjacent adapter pair to share a common separating wall and the openings 502 to be lined up along their minor dimensions increasing the density of adapters 315. In one embodiment, two adjacent connectors have a port center to port center dimension CC of about 0.364 inches (see FIG. 19). In one embodiment that has six adapter openings, the adapter array has a length L1 of about 2.185 inches.

In one embodiment, the adapter module 316 has a total length LM (see FIG. 18) of about 2.885 inches, a total height HM from the end of the push/pull tab 542 to the end of the guide extension 532 (see FIG. 18) of about 2.65 inches, and width WM (see FIG. 17) of about 0.5 inches.

Although in the embodiments described herein, the module is configured for SC connectors only, since there are different types of SC connectors in the industry, the housing may include indentations for placing designation labels 560 (see FIG. 12) for identification purposes. In the embodiments described herein, the module is configured for SC connectors only. However, other housings defining an integral array of various different kinds of adapters are also contemplated.

It should be understood that the high-density distribution frame 11 and the fiber termination blocks 101, 300 of FIGS. 1-3 are only a couple examples of the many different types of devices or fixtures where the sliding adapter modules 116, 316 described herein can be utilized. For example, the fixture can be in the form of a chassis with a movable drawer as in U.S. Pat. No. 6,504,988 and U.S. Patent Application Publication No. 2003/0007767, the disclosures of which are incorporated by reference.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic adapter assembly comprising:
   a one-piece housing including a length extending from a first end to a second end of the housing, the housing including at least three adjacent openings arranged in a stacked configuration along the length extending from the first end to the second end of the housing, each opening defining a separate fiber optic adapter for interconnecting two cables terminated with fiber optic connectors, each opening defining a longitudinal axis; and
   a sleeve mount mounted within each of the openings of the housing, the sleeve mount configured to be inserted into the opening in a direction extending from a first end to a second end of the opening, generally parallel to the longitudinal axis of the opening; wherein the at least three openings each define a common wall separating each of the openings, each common wall extending from the first end to the second end of the opening, generally parallel to the longitudinal axis of the opening, the common wall including a slit separating the common wall into a first wall section and a second wall section, the first wall section defining an inner surface of a first of the at least three openings and the second wall section defining an inner surface of a second of the at least three openings that is adjacent to the first opening of the at least three openings, the first wall section spaced apart from and opposing the second wall section along a direction extending generally parallel to the length of the one-piece housing, wherein during insertion of the sleeve mount within the opening, one of the first wall section and the second wall section separated by the slit is configured to flex toward the other of the first wall section and the second wall section along a direction generally parallel to the length of the one-piece housing to receive the sleeve mount.

2. A fiber optic adapter assembly according to claim 1, wherein the sleeve mount forms a snap-fit arrangement with the housing within the opening.

3. A fiber optic adapter assembly according to claim 1, wherein the fiber optic adapters are configured for interconnecting SC-type fiber optic connectors.

4. A fiber optic adapter assembly according to claim 1, further including a fixture, the one-piece housing being movably mounted to the fixture, wherein the housing is movable relative to the fixture between a first position and a second position, the housing being movable along a line of travel that is non-parallel to the longitudinal axes of the openings.

5. A fiber optic adapter assembly according to claim 4, wherein the housing and the fixture include intermating structure for providing sliding movement of the housing relative to the fixture.

6. A fiber optic adapter assembly according to claim 4, further including a locking member attached to the one-piece housing wherein the locking member interlocks with the fixture for preventing the housing from moving relative to the fixture.

7. A fiber optic adapter assembly according to claim 1, wherein each of the at least three openings includes a major dimension and a minor dimension, the major dimension being greater than the minor dimension, wherein the openings are aligned along the minor dimensions of the openings to form an array of adapters.

8. A fiber optic adapter assembly according to claim 1, wherein the distance from a center of one of the three openings to a center of an adjacent opening is about 0.364 inches.

9. A fiber optic adapter assembly according to claim 1, wherein the housing includes six of the openings arranged in a stacked configuration along the length extending from the first end to the second end of the housing, each opening defining a separate fiber optic adapter.

10. A fiber optic adapter assembly comprising:
    a one-piece housing including a length extending from a first end to a second end of the housing, the housing including at least two adjacent openings arranged in a stacked configuration along the length extending from the first end to the second end of the housing, each opening defining a separate fiber optic adapter for interconnecting two cables terminated with fiber optic connectors, each opening defining a longitudinal axis; and
    a ferrule alignment arrangement mounted within each of the openings of the housing, at least a portion of the ferrule alignment arrangement being mounted within the housing with a snap-fit, the ferrule alignment arrangement configured to be inserted into the opening in a direction extending from a first end to a second end of the opening, generally parallel to the longitudinal axis of the opening;
    wherein the at least two openings define a common wall separating each of the openings, the common wall extending from the first end to the second end of the opening, generally parallel to the longitudinal axis of the openings, the common wall including a slit separating the common wall into a first wall section and a second wall section, the first wall section defining an inner surface of a first of the at least two openings and the second wall section defining an inner surface of a second of the at least two openings that is adjacent to the first opening of the at least two openings, the first wall section spaced apart from and opposing the second wall section along a direction extending generally parallel to the length of the one-piece housing, wherein during insertion of the ferrule alignment arrangement within the opening, one of the first wall section and the second wall section separated by the slit is configured to flex toward the other of the first wall section and the second wall section along a direction generally parallel to the length of the one-piece housing to receive the ferrule alignment arrangement.

11. A fiber optic adapter assembly comprising:

a fixture; and a plurality of one-piece housings, each housing including a length extending from a first end to a second end of the housing, the housing including at least three adjacent openings arranged in a stacked configuration along the length extending from the first end to the second end of the housing, each opening defining a separate fiber optic adapter for interconnecting two cables terminated with fiber optic connectors, each opening defining a longitudinal axis, the housing being movably mounted to the fixture, wherein the housing is movable relative to the fixture between a first position and a second position, the housing being movable along a line of travel that is non-parallel to the longitudinal axes of the openings;

wherein a sleeve mount is mounted within each of the openings of each of the housings, the sleeve mount configured to be inserted into the opening in a direction extending from a first end to a second end of the opening, generally parallel to the longitudinal axis of the opening, wherein the at least three openings each define a common wall separating each of the openings, each common wall extending from the first end to the second end of the opening, generally parallel to the longitudinal axis of the opening, the common wall including a slit separating the common wall into a first wall section and a second wall section, the first wall section defining an inner surface of a first of the at least three openings and the second wall section defining an inner surface of a second of the at least three openings that is adjacent to the first opening of the at least three openings, the first wall section spaced apart from and opposing the second wall section along a direction extending generally parallel to the length of the one-piece housing, wherein during insertion of the sleeve mount within the opening, one of the first wall section and the second wall section separated by the slit is configured to flex toward the other of the first wall section and the second wall section along a direction generally parallel to the length of the one-piece housing to receive the sleeve mount.

12. A fiber optic adapter assembly according to claim 11, wherein each housing includes six of the openings arranged in a stacked configuration along the length extending from the first end to the second end of the housing, each opening defining a separate fiber optic adapter.

13. A fiber optic adapter assembly according to claim 11, wherein the sleeve mount forms a snap-fit arrangement with each housing within the opening.

14. A fiber optic adapter assembly according to claim 11, wherein the fiber optic adapters are configured for interconnecting SC-type fiber optic connectors.

15. A fiber optic adapter assembly according to claim 11, wherein each housing and the fixture include intermating structure for providing sliding movement of the housing relative to the fixture.

16. A fiber optic adapter assembly according to claim 11, further including a locking member attached to each one-piece housing wherein the locking member interlocks with the fixture for preventing the housing from moving relative to the fixture.

17. A fiber optic adapter assembly according to claim 11, wherein each of the at least three openings in each housing includes a major dimension and a minor dimension, the major dimension being greater than the minor dimension, wherein the openings are aligned along the minor dimensions of the openings to form an array of adapters in each housing.

18. A fiber optic adapter assembly according to claim 11, wherein the distance from a center of one of the three openings to a center of an adjacent opening is about 0.364 inches.

* * * * *